United States Patent
Hoexum et al.

(10) Patent No.: US 11,165,951 B2
(45) Date of Patent: Nov. 2, 2021

(54) IMAGE CAPTURING

(71) Applicant: KONINKLIJKE PHILIPS N.V., Eindhoven (NL)

(72) Inventors: Everhardus Johannes Hoexum, Drachten (NL); Luc Berntsen, Friesland (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 16/340,896

(22) PCT Filed: Feb. 20, 2018

(86) PCT No.: PCT/EP2018/054190
§ 371 (c)(1),
(2) Date: Apr. 10, 2019

(87) PCT Pub. No.: WO2018/150057
PCT Pub. Date: Aug. 23, 2018

(65) Prior Publication Data
US 2019/0364197 A1    Nov. 28, 2019

(30) Foreign Application Priority Data
Feb. 20, 2017 (EP) .................................. 17156834

(51) Int. Cl.
*H04N 5/232* (2006.01)
*H04N 5/235* (2006.01)

(52) U.S. Cl.
CPC ..... *H04N 5/23219* (2013.01); *H04N 5/23293* (2013.01); *H04N 5/2356* (2013.01); *H04N 5/232133* (2018.08)

(58) Field of Classification Search
CPC .......... H04N 5/23219; H04N 5/23293; H04N 5/2356; H04N 5/232133; H04N 5/232; G03B 15/00
See application file for complete search history.

(56) References Cited

U.S. PATENT DOCUMENTS

| | | | |
|---|---|---|---|
| 5,900,909 A | 5/1999 | Parulski | |
| 7,676,150 B2 | 3/2010 | Nakashima | |
| 8,542,879 B1* | 9/2013 | Nechyba | G06K 9/00221 382/103 |
| 9,122,320 B1 | 9/2015 | Rowles | |

(Continued)

FOREIGN PATENT DOCUMENTS

| | | |
|---|---|---|
| JP | 2006268248 | 10/2006 |
| JP | 2007147671 A | 6/2007 |

(Continued)

OTHER PUBLICATIONS

International Search Report/Written Opinion dated May 23, 2018.

*Primary Examiner* — Shahbaz Nazrul (57) ABSTRACT

A method, apparatus and a machine-readable medium, for capturing an image of a subject includes moving at least one of an image capture device and the subject relative to one another; monitoring, using a processor, an orientation of the subject relative to the image capture device; and upon determining, using a processor, that the subject is oriented in a defined orientation relative to the image capture device, capturing an image of the subject in the defined orientation using the image capture device.

20 Claims, 8 Drawing Sheets

(56) References Cited

U.S. PATENT DOCUMENTS

| | | | |
|---|---|---|---|
| 10,225,469 B2 * | 3/2019 | Arai | H04N 5/23216 |
| 2007/0040033 A1 | 2/2007 | Rosenberg | |
| 2009/0303320 A1 | 12/2009 | Davis | |
| 2011/0298929 A1 | 12/2011 | Garcia | |
| 2012/0177350 A1 * | 7/2012 | Jancourtz | F16M 11/08 |
| | | | 396/5 |
| 2012/0022961 A1 | 9/2012 | Koike | |
| 2016/0353022 A1 * | 12/2016 | Mueller | F16M 13/027 |
| 2019/0080066 A1 * | 3/2019 | Van Os | G06F 21/32 |

FOREIGN PATENT DOCUMENTS

| | | |
|---|---|---|
| JP | 2007208355 | 8/2007 |
| JP | 2009071515 | 4/2009 |
| JP | 2011176386 | 9/2011 |
| JP | 2012065260 | 3/2012 |
| JP | 2016004241 | 1/2016 |
| WO | 9629675 A1 | 9/1996 |
| WO | 9820458 A1 | 5/1998 |
| WO | 2006017498 A2 | 2/2006 |
| WO | 2013011380 A2 | 1/2013 |

\* cited by examiner

IMAGE CAPTURING

This application is the U.S. National Phase application under 35 U.S.C. § 371 of International Application No. PCT/EP2018/054190, filed on Feb. 20, 2018, which claims the benefit of European Application No. 17156834.8, filed Feb. 20, 2017. These applications are hereby incorporated by reference herein.

TECHNICAL FIELD OF THE INVENTION

The invention relates to capturing an image and, more particularly, to capturing an image of a subject when the subject is in a particular orientation.

BACKGROUND TO THE INVENTION

A person may use a mirror to perform a personal care activity to his or her head or body. For example, a person may perform an activity such as hair styling, hair trimming, hair shaving, epilating, applying makeup, cleansing, or skin care, such as moisturising. A mirror may be used to enable the person to see himself or herself more clearly so that the personal care activity can be performed accurately and in a desired manner. If the person wishes to perform the personal care activity to the side or back of their head or body, or if the person wishes to view the side or back of their head or body for any other reason, a second mirror may be used. The second mirror may be positioned in such a way that the person can see a reflection of the side or back of their head or body using both mirrors. Arranging oneself and the mirrors such that the desired part of the head or body is clearly visible can be difficult, particularly if the personal care activity is to be performed while manoeuvring the second mirror.

In one example, a person may wish to trim the hair on the back of their head using hair clippers. It is not possible for the person to see the back of their head in a single mirror, so the person may hold a second mirror behind their head so that the reflection is visible to them in the first mirror. The person may check the reflection to check that all of the intended hair has been trimmed, and that the hair has been trimmed symmetrically.

A mirror, or a two mirror arrangement as discussed above, may also be used by a person to view a side or back of their body when getting dressed or trying on clothes. Viewing the back or side of one's body may be difficult if the second mirror is not held far enough away from the person.

SUMMARY OF THE INVENTION

In order to view a side or back of one's head or body clearly, it would be useful to be able to have an image of the desired portion of the head or body, from a desired angle. Therefore, there exists a need for a method for capturing an image of a portion of a person's head or body that cannot easily be viewed by the person.

According to a first aspect, there is provided a method of capturing an image of a subject, the method comprising: moving at least one of an image capture device and the subject relative to one another; monitoring, using a processor, an orientation of the subject relative to the image capture device; and upon determining, using a processor, that the subject is oriented in a defined orientation relative to the image capture device, capturing an image of the subject in the defined orientation using the image capture device In some embodiments, the method may further comprise, during said moving, capturing a series of images of the subject using the image capture device.

The method may further comprise displaying the captured series of images to a user.

The monitoring may, in some embodiments, comprise determining, from the captured series of images of the subject, the orientation of the subject relative to the image capture device.

The defined orientation may comprise one of a plurality of defined orientations. The method may further comprise, upon determining that the subject is oriented in any of the defined orientations, capturing an image of the subject in the defined orientation using the image capture device.

In some embodiments, the moving may comprise at least one of: i) moving the image capture device around the subject; and ii) rotating the subject relative to the image capture device.

The subject may have an axis of rotation. The defined orientation of the subject relative to the image capture device may comprise a yaw rotation about a vertical axis of rotation through the centre of the subject of at least one of: 0 degrees, 45 degrees, 90 degrees, 135 degrees, 180 degrees, 225 degrees, 270 degrees and 315 degrees.

In some embodiments, the method may further comprise storing the captured image in a storage medium. The method may further comprise displaying the captured image to a user.

In some embodiments, the method may comprise, after a defined duration has elapsed following said capturing of the image: upon determining, using a processor, that the subject is oriented in the defined orientation relative to the image capture device, capturing a second image of the subject in the defined orientation using the image capture device.

The method may further comprise, upon determining, using a processor, that the subject is oriented within a defined angular range of the defined orientation relative to the image capture device, capturing a plurality of images of the subject. The method further comprise selecting an optimal image from the plurality of images. In some embodiments, the method may comprise displaying the optimal image to a user.

According to a second aspect, there is provided an apparatus for capturing an image of a subject. The apparatus comprises an image capture device for capturing a series of images of the subject; and a processor. The processor is configured to monitor the orientation of the subject relative to the apparatus; and upon determining that the subject is oriented in a defined orientation relative to the apparatus, operate the image capture device to capture an image of the subject in the defined orientation.

In some embodiments, the apparatus may further comprise a display screen for displaying at least one of the captured image of the subject and the captured series of images of the subject to a user.

The apparatus may further comprise a storage medium for storing at least one of the captured image of the subject and the captured series of images of the subject.

According to a third aspect, there is provided a machine readable medium comprising instructions which, when executed by a processor, cause the processor to monitor an orientation of a subject relative to an image capture device as at least one of the image capture device and the subject is moved relative to the other; and upon determining that the subject is oriented in a defined orientation relative to the image capture device, operate the image capture device to capture an image of the subject in the defined orientation.

Other advantageous features will become apparent from the following description.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

It can be useful to be able to view an image of the side and/or back of one's head or body, particularly while performing, or after having performed, a personal care activity. The present invention provides a convenient way for a user to capture an image of part of their head and/or their body which might otherwise be difficult or impossible to see without the use of additional mirrors. The present invention may be beneficial in a large number of fields, but may find particular advantages in the field of personal care. For example, the invention may be implemented when performing personal care activities including, but not limited to make-up application, make-up removal, skin care, skin sensing, hair care and hair removal activities, such as shaving, epilating and trimming. The invention may also be implemented when selecting clothing combinations, and getting dressed. For example, a user may use the invention to enable them to see what their outfit looks like from behind.

In general, the invention provides a method and apparatus for capturing an image of a subject. The image may be captured automatically when the subject is positioned and/or oriented in a particular defined manner relative to the image capture device. In other words, the image may be captured automatically in response to a trigger, a signal or any event.

Figure 1:
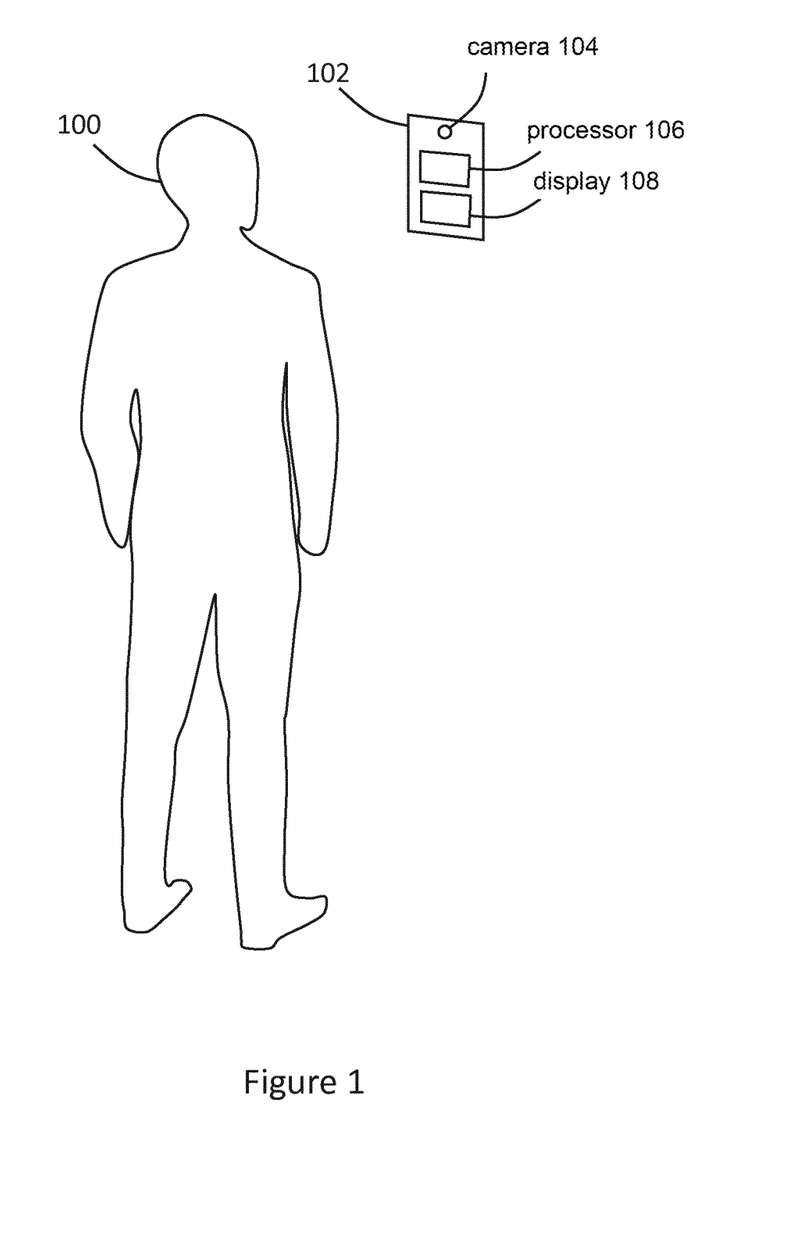
FIG. 1 is an illustration of a subject and an apparatus according to embodiments of the invention.

Referring to the drawings, FIG. 1 shows a subject 100 and an apparatus 102. In this example, the subject 100—a person—is stood facing in the general direction of the apparatus 102. The apparatus includes at least an image capture device 104, such as a camera. The image capture device 104 may be any image capture device suitable for capturing still images (e.g. photographs) and live image streams (e.g. video), such as a camera module. The image capture device 104 may itself include various components, such as one or more lenses and other optical components, and an image capture component, such as a charge-coupled device (CCD). Components within the image capture device 104, and types of image capture device suitable for use in the invention will be apparent to those skilled in the art. The apparatus 102 may further include a processor 106 for processing images captured by the image capture device 104. In some embodiments, the apparatus may further include a display 108 for displaying information and/or images captured by the image capture device 104 to the user. The apparatus 102 is discussed in greater detail below.

The person 100 may use the apparatus 102 to show a live, real time image of himself or herself, for example by viewing an image captured by the image capture device 104 on the display 108 or on another display associated with the apparatus. The person 100 may wish to view the back of their head, for example, to check whether their hair is styled as desired. The person 100 may use the apparatus to implement the invention as described below with reference to FIG. 2.

Figure 2:
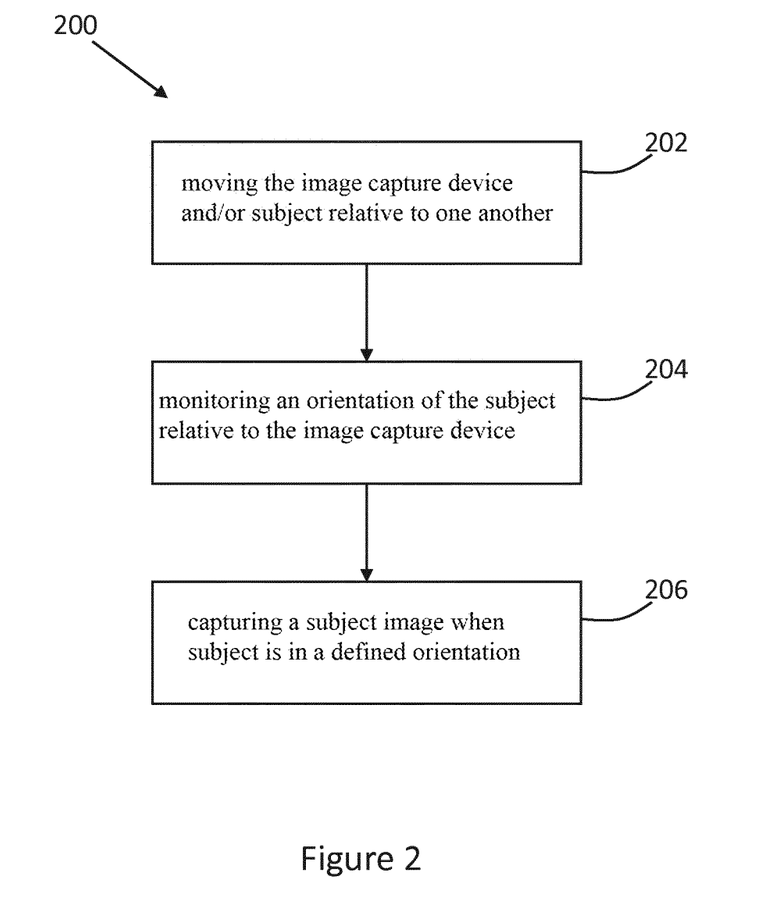
FIG. 2 is a flowchart of an example of a method for capturing an image of a subject according to embodiments of the invention.

FIG. 2 shows a flowchart of an example method 200 of capturing an image of a subject. The method comprises, at step 202, moving at least one of an image capture device and the subject relative to one another. In other words, the image capture device, such as the image capture device 104, may be moved while the subject 100 remains relatively stationary, the subject may move while the image capture device remains relatively stationary, or the image capture device 104 and the subject 100 may both move relative to one another. Thus, according to some embodiments of the invention, the person 100 may rotate relative to the image capture device 104, the image capture device may be moved around the person, or the image capture device may be moved around the person as the person as the person rotates. These various options are shown in FIGS. 3 and 4.

Figure 3:
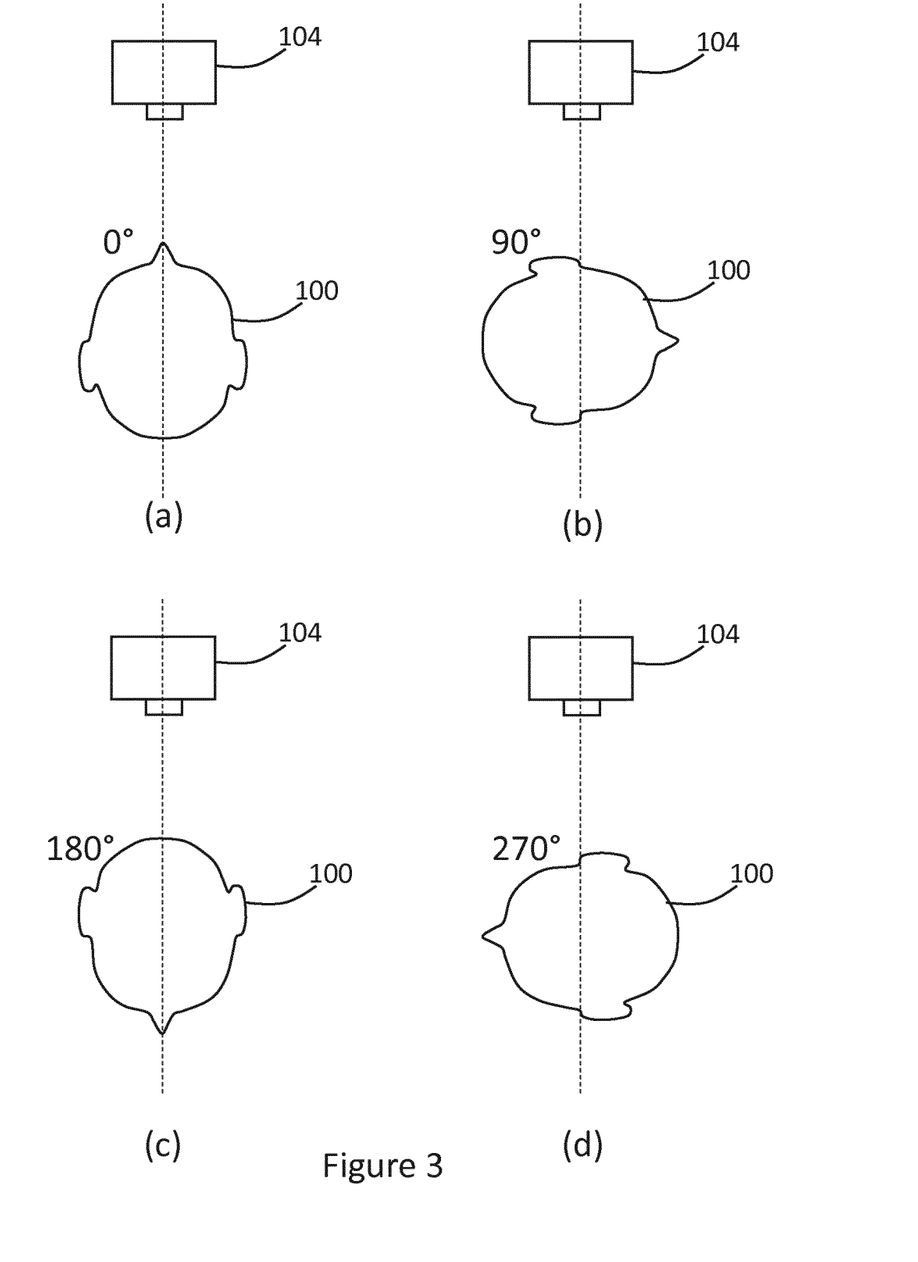
FIG. 3 is a schematic illustration of an example of an image capture device capturing images of a subject at different orientations.

FIG. 3 shows, schematically, the person 100 standing in various rotational orientations with respect to the image capture device 104. In this example, the image capture device 104 may be secured in a stationary position relative to the person 100. For example, the image capture device 104 may be secured to a surface, such as a wall, or may be resting on a surface such as a shelf. In FIG. 3a, the person 100 is shown facing the image capture device 104 directly, such that the angle of rotation of the person relative to the image capture device can be considered to be zero degrees (0°). In FIG. 3b, the person 100 has rotated (about the point on which he or she is standing, or about a vertical axis through the centre of the person) through 90 degrees to the right. The image capture device 104 is in the same position and orientation as in FIG. 3a, such that the image capture device faces the person's left ear. In FIG. 3c, the person 100 has rotated through a further 90 degrees to the right so that the person is facing directly away from the image capture device 104. The image capture device 104 is in the same position and orientation as in FIGS. 3a and 3b, such that the image capture device faces the back of the person's head. In FIG. 3d, the person 100 has rotated through a further 90 degrees to the right. The image capture device 104 is in the same position and orientation as in FIGS. 3a, 3b, and 3c, such that the image capture device faces the person's right ear. If the person 100 continues the rotation so that they are facing the image capture device 104 as in FIG. 3a, then the person will have rotated through 360 degrees. During the rotation of the person 100, the field of view of the image capture device 104 includes all angles of rotation of the person.

Figure 4:
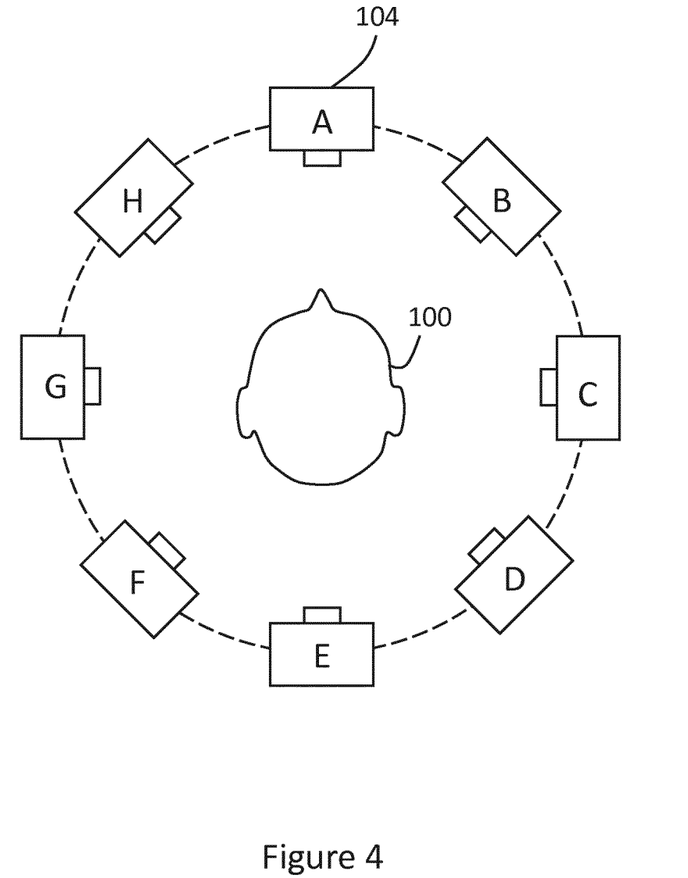
FIG. 4 is a schematic illustration of a further example of an image capture device capturing images of a subject at different orientations.

FIG. 4 shows an alternative way of enabling the field of view of the image capture device 104 to include all angles of rotation of the person 100. In FIG. 4, the image capture device 104 is moved around the person 100 as the person remains relatively still (i.e. the person does not rotate). When the image capture device 104 is in a position marked A in FIG. 4, the person 100 is facing the image capture device directly, such that the angle of rotation of the person relative to the image capture device can be considered to be zero degrees (0°). As the image capture device 104 moves around the person 100, it passes through positions marked B to H, where position B represents a movement through an angle of approximately 45 degrees, C represents a movement through an angle of approximately 90 degrees, D represents a movement through an angle of approximately 135 degrees, E represents a movement through an angle of approximately 180 degrees, F represents a movement through an angle of approximately 225 degrees, G represents a movement through an angle of approximately 270 degrees and H represents a movement through an angle of approximately 315 degrees. As with the arrangement shown in FIG. 3, the field of view of the image capture device 104 includes all angles of rotation of the person 100 as it moves around the person.

The movement of the image capture device 104 around the person 100 (as shown in FIG. 4) may be achieved in a number of ways. In some embodiments, the image capture device 104 may be attached to a mechanism configured to move it around the person 100. For example, the image capture device 104 may be attached to a frame surrounding the person 100 (or surrounding a position where the subject should be located during use). The image capture device 104 may be mounted on a track such that, as the image capture device moves around the frame on the track, it passes through each of the positions A to H shown in FIG. 4. In other embodiments, the person 100 (i.e. the person to be imaged), or another person or assistant, may hold the image capture device 104 and move it around the person to be imaged in such a way that the image capture device moves in an approximate circle, passing through the positions A to H shown in FIG. 4. Of course, it will be apparent that, as the image capture device 104 is moved relative to the person 100, in order for images to be captured of the person, the lens of the image capture device must be aimed substantially at the person.

Referring again to FIG. 2, the method 200 further comprises, at step 204, monitoring an orientation of the subject (e.g. the person 100) relative to the image capture device 104. In other words, the orientation of the subject relative to the image capture device may be determined at least once during the moving (step 202). The monitoring may be performed by processing circuitry, such as a processor within, connected to, or associated with the apparatus 102. By monitoring the orientation of the subject (e.g. the person 100) relative to the image capture device 104, it can be determined when the subject is oriented in one or more of the orientations relative to the image capture device 104 as shown in FIGS. 3 and 4. The method 200 further comprises, at step 206, capturing an image. Specifically, upon determining that the subject is oriented in a defined orientation relative to the image capture device 104, the method comprises capturing an image of the subject in the defined orientation using the image capture device.

Monitoring (step 204) the orientation of the subject 100 may be achieved using one of a variety of techniques as discussed below.

One way of monitoring the orientation of the subject 100 relative to the image capture device 104 is to use a landmark detection technique to detect landmarks on the subject in order to determine its orientation. For example, in a facial tracking system, a facial feature, such as an eye, an eyebrow, a nose, a mouth or a chin, or a point of portion of a facial feature, may be detected when it is within a field of view of the image capture device 104. Points associated with the facial features are known as landmarks. A position of a landmark may be determined relative to other landmarks in the same field of view. In some embodiments, a confidence level may be associated with a determined position of a landmark. The confidence level of the determined position of a particular landmark may increase if its position is determined relative to a greater number of other landmarks. In some embodiments, the facial features listed above may be considered to be "primary" facial features, in that those features are present and detectable in a majority of human subjects. Other "secondary" facial features may also be detected. Secondary facial features might include a point on, or at least a portion of, an ear, a hairline, a neck, a skin lesion such as a mole, or a scar. Of course, while facial landmark detection may be used to track a person's head, other landmarks may be detectable and used to determine an orientation of the person's body. For example, landmarks on the body might include a point on, or at least a portion of, a shoulder, an arm, a hand, a finger or thumb, a torso, a leg, a knee, an ankle or a foot.

Using the landmark detection technique, a processor may detect when particular landmark or combination of landmarks appears within the field of view of the image capture device 104. In some embodiments, a database or lookup table may be used to determine the orientation of the subject 100 based on the detected landmark or combination of landmarks. For example, if two eyes, a nose, a mouth and parts of two ears are visible within the field of view of the image capture device 104, then it may be determined that the subject 100 is facing the image capture device (i.e. that the relative orientations are as shown in FIG. 3a, or the image capture device is in position A of FIG. 4). If portions of two ears are within the field of view of the image capture device 104, but the eyes, nose or mouth are not detected, then it may be determined that the subject is facing directly away from the within the field of view of the image capture device (i.e. that the relative orientations are as shown in FIG. 3c, or the image capture device is in position E of FIG. 4). If one ear is visible within the field of view of the image capture device 104, then it may be determined that the subject 100 is oriented side-on to the image capture device (i.e. that the relative orientations are as shown in FIG. 3b, a 90 degree rotation, or in FIG. 3d, a 270 degree rotation, or the image capture device is in one of positions C or G of FIG. 4). If other combinations of features are visible within the field of view, then it may be determined that the subject 100 is oriented at some other orientation relative to the image capture device 104, such as the relative orientations when the image capture device is in positions B, D, F or H in FIG. 4.

Another way of monitoring the orientation of the subject 100 relative to the image capture device 104 is to determine the relative width of the portion of the subject within the field of view of the image capture device 104. For example, if the width of a head of the subject 100 appears at its smallest in a particular orientation during the moving of the subject and/or the image capture device, then it may be determined that the head is either facing directly towards or away from the image capture device. However, if the width of the head of the subject 100 appears at its greatest in a particular orientation during the moving of the subject and/or the image capture device, then it may be determined that the head is oriented side-on to the image capture device. This technique may be used in combination with one or more other techniques, such as the landmark detection technique, to determine whether the subject is facing towards or away from the image capture device, facing to the left or to the right with respect to the image capture device, or oriented in some other orientation.

In some embodiments, the apparatus 102 comprising the image capture device 104 may be calibrated by allowing the image capture device to capture calibration images of the subject from a plurality of orientations. The calibration images may be stored in a storage medium associated with the apparatus and compared with images captured during use. The comparison of captured images with the calibration images (alone or in combination with one or more other techniques) may allow the processor to determine an orientation of the subject.

When the processor determines that the subject 100 is oriented in a defined orientation relative to the image capture device 104, an image of the subject in that defined orientation is captured by the image capture device. The defined orientation may be pre-programmed, or selected by a user. In some embodiments, the defined orientation comprises one of a plurality of defined orientations. For example, the defined orientations might include one or more of the orientations shown in FIGS. 3 and 4. Upon determining that the subject is oriented in any of the defined orientations, an image of the subject in the defined orientation may be captured using the image capture device 104. Thus, if the defined orientations include the orientations denoted by labels A to H in FIG. 4, then as the image capture device 104 is moved into each position, the defined orientation is recognized, and an image of the subject 100 is automatically captured. After one complete revolution of the image capture device about the subject 100, the image capture device 104 will have captured eight images.

In some embodiments, the image capture device 104 may be configured to capture a series, or stream, of images of the subject during said moving. In other words, as the subject 100 and/or the image capture device 104 are moved relative to one another, the image capture device captured video footage of the subject. The captured video footage of the subject may, in some embodiments, be displayed to a user (e.g. the subject 100). In some embodiments, the captured video footage may be stored in a storage medium associated with the apparatus 102. The stored video footage may then be viewed at a later time.

In the embodiments discussed above, the orientation of the subject relative to the image capture device is monitored in real time, as the image capture device and/or the subject move relative to one another. However, in other embodiments, the orientation of the subject may be monitored using the captured video footage. For example, a processor associated with the device may analyse the captured video footage and, upon determining that the subject is oriented in a defined orientation (relative to the image capture device when the video footage was captured) in a particular frame of the video footage, that frame may be captured as a still image. The captured imaged may be displayed to the user and/or stored in a storage medium.

So far, the orientation of the subject relative to the image capture device has been described in terms of a yaw rotation about a vertical axis through the centre of the subject 100. The subject might also move through a pitch rotation (i.e. tilting up or down) and/or a roll rotation (i.e. tilting to the left or right). While it is desirable that the pitch and roll of the subject 100 remains substantially constant throughout the moving (step 202) and the image capture (i.e. such that the subject does not tilt up, down, left or right), the apparatus may detect such additional movement. In some embodiments, particularly if the amount or pitch and/or roll rotation detected is relatively small, the processor may ignore such rotations and cause the image capture device to capture an image when the subject is oriented in a defined orientation with respect to its yaw rotation. In some embodiments, if the amount of pitch and/or roll rotation is significant, some landmarks may not be visible within the field of view of the image capture device and, therefore, it may not be possible to determine the orientation of the subject. In such cases, the apparatus may indicate to the user (e.g. using an audible or visual indication) that the orientation of the subject is such that an orientation cannot be determined.

As noted above, the defined orientations at which an images are to be captured may be selected by a user. Alternatively, the defined orientations may be pre-programmed into the apparatus. In some embodiments, the defined orientation of the subject relative to the image capture device comprises a yaw rotation about a vertical axis of rotation through the centre of the subject of at least one of: 0 degrees, 45 degrees, 90 degrees, 135 degrees, 180 degrees, 225 degrees, 270 degrees and 315 degrees. In other embodiments, other angles of rotation may be used.

Figure 5:
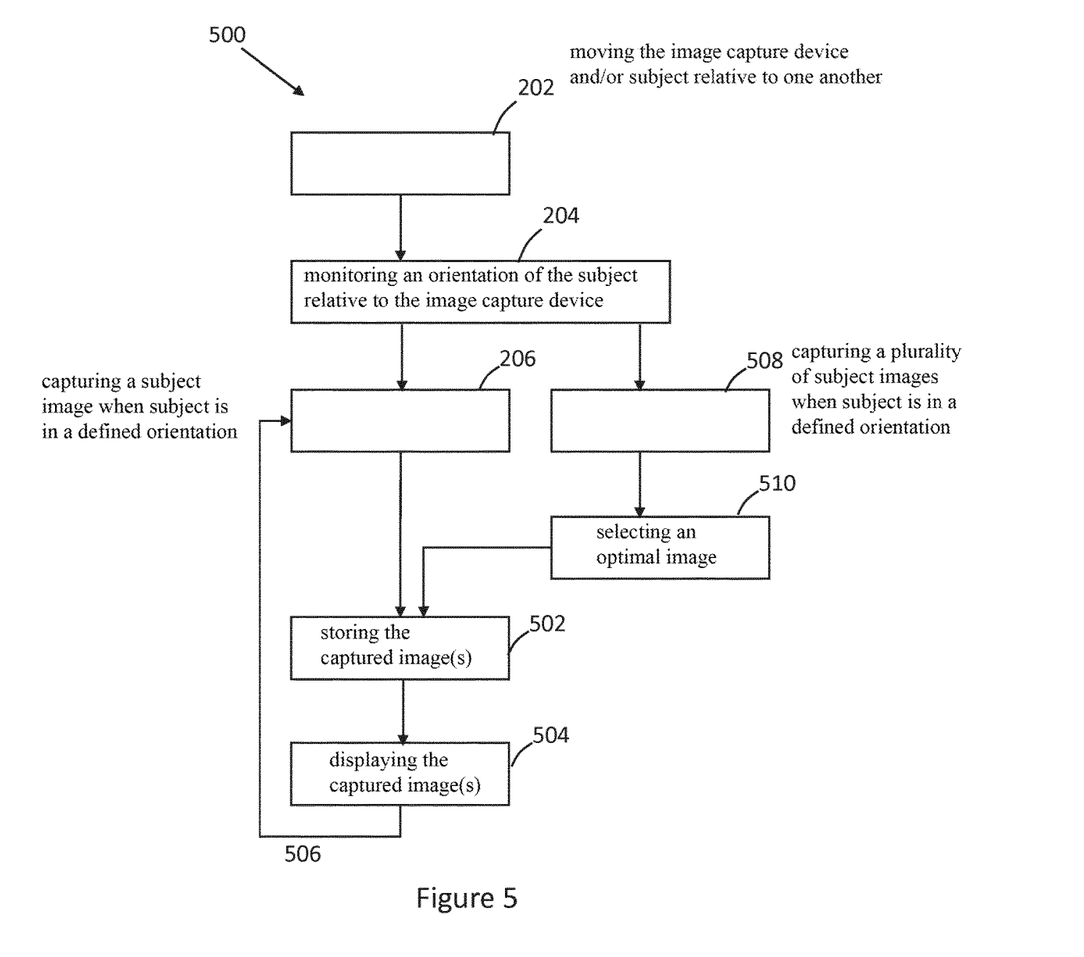
FIG. 5 is a flowchart of a further example of a method for capturing an image of a subject according to embodiments of the invention.

FIG. 5 shows a flowchart of an example of a method 500 of capturing an image of a subject. The method 500 includes steps 202, 204 and 206 of the method 200 described above, and includes additional steps which may be performed in some implementations of the invention. Following the capturing (step 206) of one or more images at the one or more defined orientations of the subject 100 relative to the image capture device 104, the method 500 may comprise, at step 502, storing the captured image or images in a storage medium. In some embodiments, the method 500 may further comprise, at step 504, displaying the captured image to a user (e.g. the subject 100). Where multiple images are captured, one or more of the captured images may be stored and/or displayed to the user.

After an image has been captured at step 206 (or after the storing and/or displaying of the image at steps 502 and 504), the processor associated with the apparatus 102 may allow a defined duration to elapse before a further image can be captured of the subject in the same orientation. In some embodiments, after a duration has elapsed following said capturing of the image (step 206), the method 500 may comprise (step 506), upon determining, using a processor, that the subject is oriented in the defined orientation relative to the image capture device, capturing a second image of the subject in the defined orientation using the image capture device. For example, if a first image has been captured of the back of a subject (e.g. an image of the back of the subject) then, before a defined duration has elapsed, the image capture device will not capture a further image of the subject in that same orientation until after the expiration of the defined duration, such as 10 seconds, for example. If the defined duration has elapsed then, if the subject is determined to be in the same relative orientation again (oriented such that the image capture device is facing the back of the subject), then a further image of the subject in that orientation will be captured. This allows the user to see an updated version of the image which may, for example, include changes resulting from a personal care activity having been performed. Older images (i.e. the images captured in previous image capturing instances) may be stored in a storage medium so that they may be viewed at a later time.

In some embodiments, the image capture device 104 may capture images of the subject 100 in orientations slightly different to the defined orientations. For example, an image may be captured when the subject is determined to be oriented within a defined angular range of the defined orientation. Thus, the method 500 may further comprise, at step 508, upon determining, using a processor, that the subject 100 is oriented within a defined angular range of the defined orientation relative to the image capture device 102, capturing a plurality of images of the subject. The method 500 may further comprise, at step 510, selecting an optimal image from the plurality of images. For example, the image capture device may be configured to capture ten images while it is oriented within an angular range of 5 degrees either side of the defined orientation. Some of the captured images may be of better quality (e.g. less blurring) than others. An image may be considered to be optimal based on at least one criterion. For example, in some embodiments, the image captured when the subject is closest to the defined orientation may be considered to be the optimal image. In other embodiments, the clearest and/or sharpest image of the plurality of images may be considered to be the optimal images. In some embodiments, an optimal image may be selected based on a combination of criteria. The image selected as the optimal image may be stored in a storage medium (step 502) and/or displayed to the user (step 504).

Figure 6:
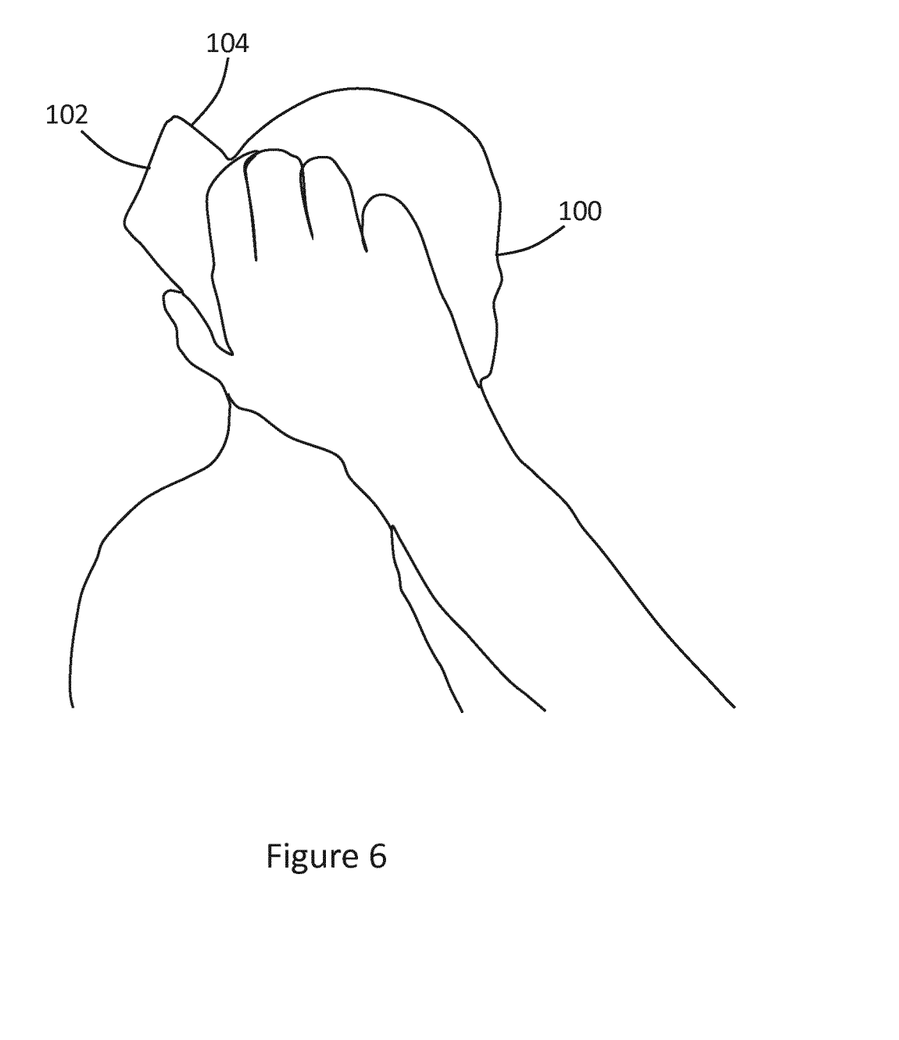
FIG. 6 is an illustration of an image capture device being used to capture an image of a subject.

As will be appreciated, an orientation of the subject 100 relative to the image capture device 104 may be determined more easily if each image is captured with the image capture device in the same orientation relative to the subject (e.g. with the image capture device held horizontally during each image capture). However, in practice, the image capture device may be tilted during the moving (step 202) such that, when an image is captured, it is at an orientation that differs from an orientation of a previously-taken image. Such a scenario is shown in FIG. 6. In FIG. 6, the subject 100 is holding an apparatus 102 having an image capture device 104. In the embodiment shown, the subject 100 is operating the image capture device 104 in a manner similar to that shown in FIG. 4, namely whereby the image capture device is moved around the subject (in this case, the subject's head) in order to capture images at all defined orientations. As shown in FIG. 6, when the apparatus 102 is moved to a position around the back of the subject 100, it is not oriented horizontally or vertically. Thus, an image captured of the back of the subject may not be in a portrait or landscape orientation. A processor associated with the apparatus 102 may, in some embodiments, compensate or correct for any change in orientation of the image capture device 104 between successive captured images. For example, in some embodiments, the processor may use an accelerometer or the like associated with the apparatus 102 to determine the orientation of the apparatus at the time of capturing the image. The determined orientation of the apparatus may then be used to determine the relative orientation of the subject relative to the apparatus 102 and the image capture device 104. In some embodiments, the processor may use landmarks detected in a captured image to determine an orientation of the subject relative to the apparatus 102. For example, if, from the landmarks in a captured image, it is determined that the subject is tilted 30 degrees to the right (i.e. roll=30 degrees), then the processor may correct the image by rotating the image to 30 degrees to the left. In this way, a user can move the image capture device 104 around their head without the need to keep the image capture device oriented in a particular orientation. Thus, moving (step 202) may be performed easily by a user without the need for specialist equipment.

Figure 7:
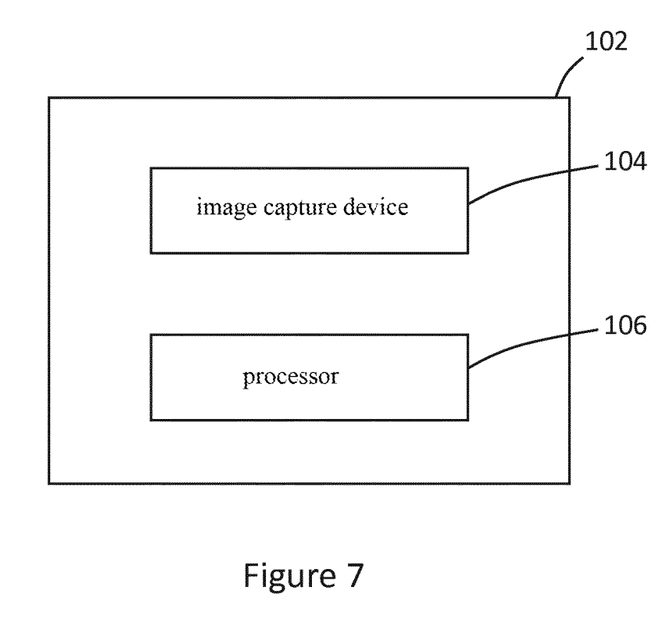
FIG. 7 is a schematic illustration of an example of an apparatus for capturing an image of a subject according to embodiments of the invention.

So far, invention has been described in terms of a method for capturing an image of a subject. The apparatus 102 used to capture an image of the subject has discussed briefly above. The apparatus 102, which form as additional aspect of the invention is shown schematically in FIG. 7. The apparatus 102 comprises an image capture device 104 for capturing a series of images of the subject; and a processor 106. The processor 106 is configured to monitor the orientation of the subject relative to the apparatus; and upon determining that the subject is oriented in a defined orientation relative to the apparatus, operate the image capture device to capture an image of the subject in the defined orientation. In some embodiments, the apparatus 102 may comprise a plurality of image capture devices 104. Each image capture device may be connected to a separate processor. Alternatively, all of the image capture devices may be connected to one or more processors.

The apparatus 102 may be any computing device having an element, such as a camera, capable of capturing images, and a processor. For example, in some embodiments, the apparatus 102 may comprise a smart phone, a tablet computer, a laptop computer, a digital camera (with processing capabilities or with an associated processor), a smart watch, smart glasses, or a smart mirror.

Figure 8:
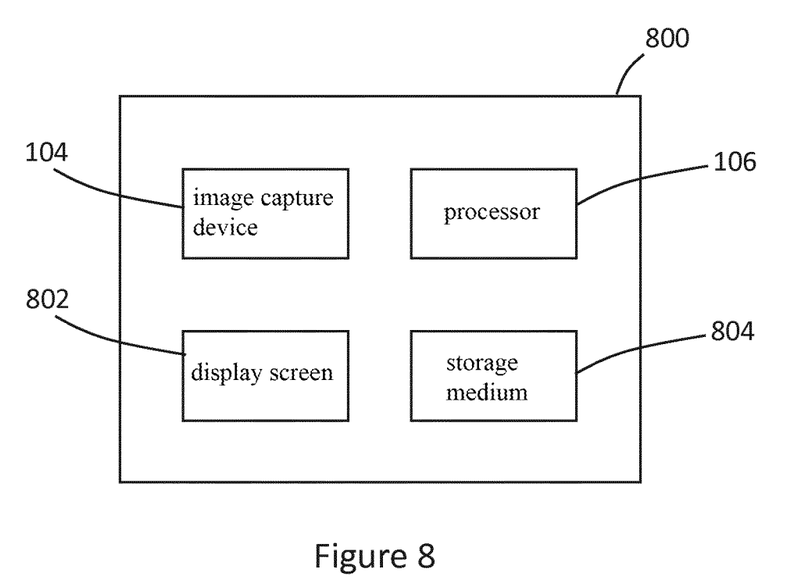
FIG. 8 is a schematic illustration of a further example of an apparatus for capturing an image of a subject according to embodiments of the invention.

FIG. 8 shows a schematic illustration of a further example of an apparatus 800 for capturing an image of a subject. The apparatus 800 includes the image capture device 104 and the processor 106 as in FIG. 7. The apparatus 800 may also comprise a display screen 802 for displaying at least one of the captured image of the subject and the captured series of images of the subject to a user. The display screen 802 may be similar to the display 108 shown in FIG. 1. The display screen 802 may be a touch screen display capable of functioning as a touch input interface for receiving user inputs. In some embodiments, the apparatus 800 may further comprise a storage medium 804 for storing at least one of the captured image of the subject and the captured series of images of the subject. The storage medium 804 may comprise a machine-readable medium, or memory unit, within the apparatus 800, and may also be configured to store other data. For example, the storage medium 804 may be configured to store instructions which can be executed by the processor 106.

Figure 9:
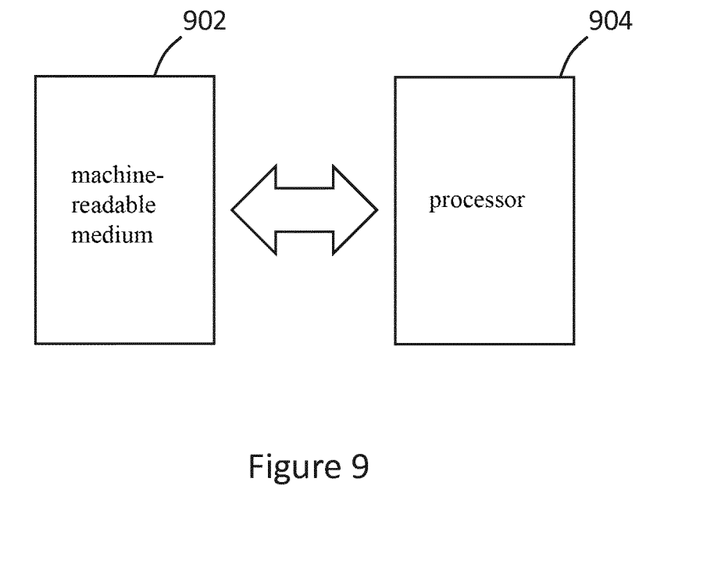
FIG. 9 is a schematic illustration of an example machine-readable medium with a processor.

A further aspect of the invention relates to a machine-readable medium. FIG. 9 shows, schematically, an example of a machine-readable medium 902 with a processor 904. The machine-readable medium 902 comprises instructions which, when executed by the processor 904, cause the processor to: monitor an orientation of a subject 100 relative to an image capture device 104 as at least one of the image capture device and the subject is moved relative to the other; and, upon determining that the subject is oriented in a defined orientation relative to the image capture device, operate the image capture device to capture an image of the subject in the defined orientation. The processor 904 may be similar to the processor 106 discussed above. The machine-readable medium 902 may be similar to the storage medium 804 discussed above. Both the machine-readable medium 902 and the processor 904 may be implemented within an apparatus such as the apparatus 102.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of capturing an image of a subject, the method comprising acts of:
   moving at least one of an image capture device and the subject relative to one another;
   capturing, using the image capture device during the moving act, video footage of the subject, wherein the video footage includes a series of images of the subject;
   displaying the video footage of the subject on a display;
   providing, by a processor, a plurality of defined orientations of the subject relative to the image capture device;
   determining, using the processor, an orientation of the subject relative to the image capture device for each image of the series of images as the at least one of the image capture device and the subject is moved relative to one another for determining that the subject is oriented in a defined orientation of the plurality of defined orientations relative to the image capture device;
   determining, using the processor, that the subject is oriented in the defined orientation;
   in response to the act of determining that the subject is oriented in the defined orientation, capturing, from the video footage, a still image of the subject in the defined orientation; and
   displaying the still image on the display.

2. The method according to claim 1, wherein the moving comprises at least one of acts of:
   i) moving the image capture device around the subject; and
   ii) rotating the subject relative to the image capture device.

3. The method according to claim 1, wherein the plurality of defined orientations of the subject relative to the image capture device comprises a yaw rotation about a vertical axis of rotation through the center of the subject of at least one of: 0 degrees, 45 degrees, 90 degrees, 135 degrees, 180 degrees, 225 degrees, 270 degrees and 315 degrees.

4. The method according to claim 1, further comprising an act of:
   storing at least one of the still image and the video footage in a storage medium.

5. The method according to claim 1, further comprising, after a defined duration has elapsed following said capturing of the image, an act of:
   in response to the act of determining that the subject is oriented in the defined orientation relative to the image capture device, capturing a second image of the subject in the defined orientation using the image capture device.

6. The method according to claim 1, further comprising an acts of:
   in response to the act of determining that the subject is oriented within a defined angular range of the defined orientation relative to the image capture device, capturing a plurality of images of the subject;
   selecting an optimal image from the plurality of images; and
   displaying the optimal image to a user.

7. An apparatus for capturing an image of a subject, the apparatus comprising:
   an image capture device configured to capture video footage of the subject, the video footage including a series of images of the subject; and
   a processor configured to:
   operate the image capture device to capture the video footage of the subject as at least one of the image capture device and the subject is moved relative to one another;
   provide the video footage for display to the subject;
   receive an indication of a plurality of defined orientations of the subject relative to the image capture device;
   determine an orientation of the subject relative to the image capture device for each image of the series of images as at least one of the image capture device and the subject are moved relative to one another for determining that the subject is oriented in a defined orientation of the plurality of defined orientations relative to the image capture device;
   determine that the subject is oriented in the defined orientation;
   in response to the determination the that the subject is oriented in the defined orientation, capture, from the video footage, a still image of the subject in the defined orientation; and
   provide the still image for display to the subject.

8. The apparatus according to claim 7, further comprising:
   a display screen configured to display at least one of the still image and the video footage of the subject.

9. The a apparatus according to claim 7, further comprising:
   a storage medium for storing at least one of the still image and the video footage of the subject.

10. A non-transitory machine readable medium comprising instructions which, when executed by a processor, cause the processor to:
    operate an image capture device to capture video footage of a subject as at least one of the image capture device and the subject are moved relative to one another, wherein the video footage includes a series of images of the subject;
    provide the video footage for display to the subject;
    receive an indication of a plurality of defined orientations of the subject relative to the image capture device;
    determine an orientation of the subject relative to the image capture device for each image of the series of images as at least one of the image capture device and the subject is moved relative to one another for determining that the subject is oriented in a defined orientation of the plurality of defined orientations relative to the image capture device;
    determine that the subject is oriented in the defined orientation;
    in response to the determination the that the subject is oriented in the defined orientation, capture, from the video footage, a still image of the subject in the defined orientation; and
    provide the still image for display to the subject.

11. The non-transitory machine readable medium of claim 10, wherein the instructions, when executed by the processor, cause the processor to:

wait for a defined duration after capture of the video footage, and after the defined duration has elapsed, and in response to the determination that the subject is oriented in the defined orientation relative to the image capture device, operate the image capture device to capture a second image of the subject in the defined orientation.

12. The non-transitory machine readable medium of claim 10, wherein the instructions, when executed by the processor, cause the processor to:

determine, using the processor, that the subject is oriented within a defined angular range of the defined orientation relative to the image capture device;

in response to the determination that the subject is oriented within the defined angular range of the defined orientation relative to the image capture device, operate the image capture device to capture a plurality of images of the subject;

select an optimal image from the plurality of images; and display the optimal image to a user.

13. The non-transitory machine readable medium of claim 10, wherein the plurality of defined orientations of the subject relative to the image capture device comprises a yaw rotation about a vertical axis of rotation through the center of the subject of at least one of: 0 degrees, 45 degrees, 90 degrees, 135 degrees, 180 degrees, 225 degrees, 270 degrees and 315 degrees.

14. The apparatus of claim 7, wherein the processor is configured to:

wait for a defined duration after capture of the video footage, and after the defined duration has elapsed, and in response to the determination that the subject is oriented in the defined orientation relative to the image capture device, operate the image capture device to capture a second image of the subject in the defined orientation.

15. The apparatus of claim 7, wherein the processor is configured to:

determine, using the processor, that the subject is oriented within a defined angular range of the defined orientation relative to the image capture device;

in response to the determination that the subject is oriented within the defined angular range of the defined orientation relative to the image capture device, operate the image capture device to capture a plurality of images of the subject;

select an optimal image from the plurality of images; and display the optimal image to a user.

16. The apparatus of claim 7, wherein the plurality of defined orientations of the subject relative to the image capture device comprises a yaw rotation about a vertical axis of rotation through the center of the subject of at least one of: 0 degrees, 45 degrees, 90 degrees, 135 degrees, 180 degrees, 225 degrees, 270 degrees and 315 degrees.

17. The apparatus of claim 7, wherein the at least one of the image capture device and the subject is moved relative to one another by at least one of acts of:

i) moving the image capture device around the subject; and ii) rotating the subject relative to the image capture device.

18. The method of claim 6, wherein the optimal image is a clearest image closest to the defined orientation.

19. The apparatus of claim 15, wherein the optimal image is a clearest image closest to the defined orientation.

20. The non-transitory machine readable medium of claim 12, wherein the optimal image is a clearest image closest to the defined orientation.

* * * * *